June 16, 1953 V. J. TERRY ET AL 2,642,558
ELECTRIC POWER SUPPLY EQUIPMENT
Filed May 26, 1949 4 Sheets-Sheet 1

INVENTORS
VICTOR J. TERRY
RICHARD KELLY
BY R P Morris
ATTORNEY

June 16, 1953  V. J. TERRY ET AL  2,642,558
ELECTRIC POWER SUPPLY EQUIPMENT
Filed May 26, 1949  4 Sheets-Sheet 2
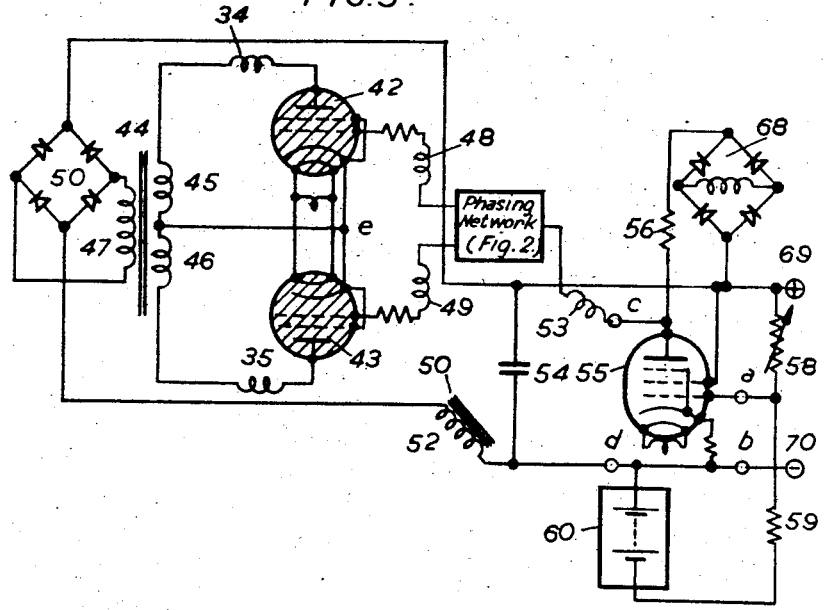
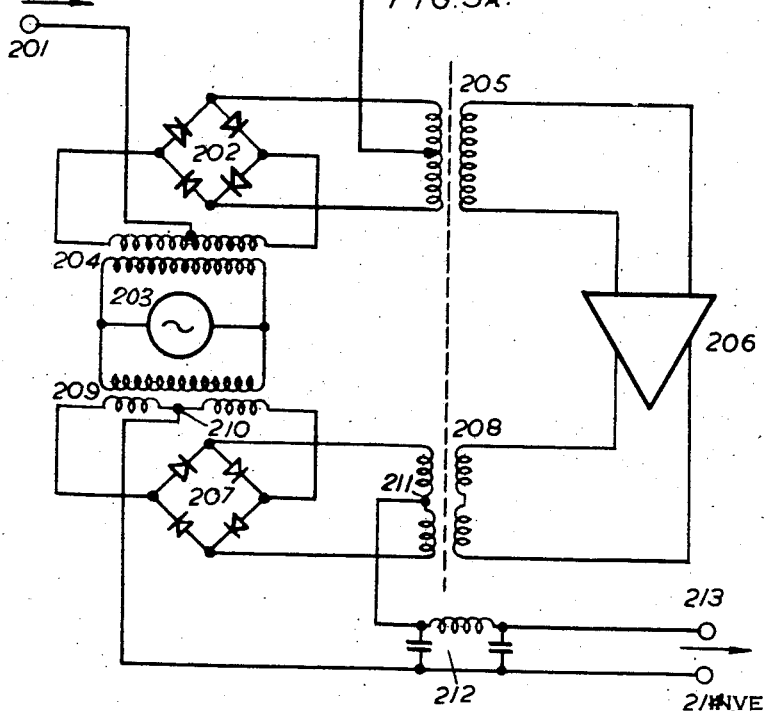
INVENTORS
VICTOR J. TERRY
RICHARD KELLY
BY
ATTORNEY

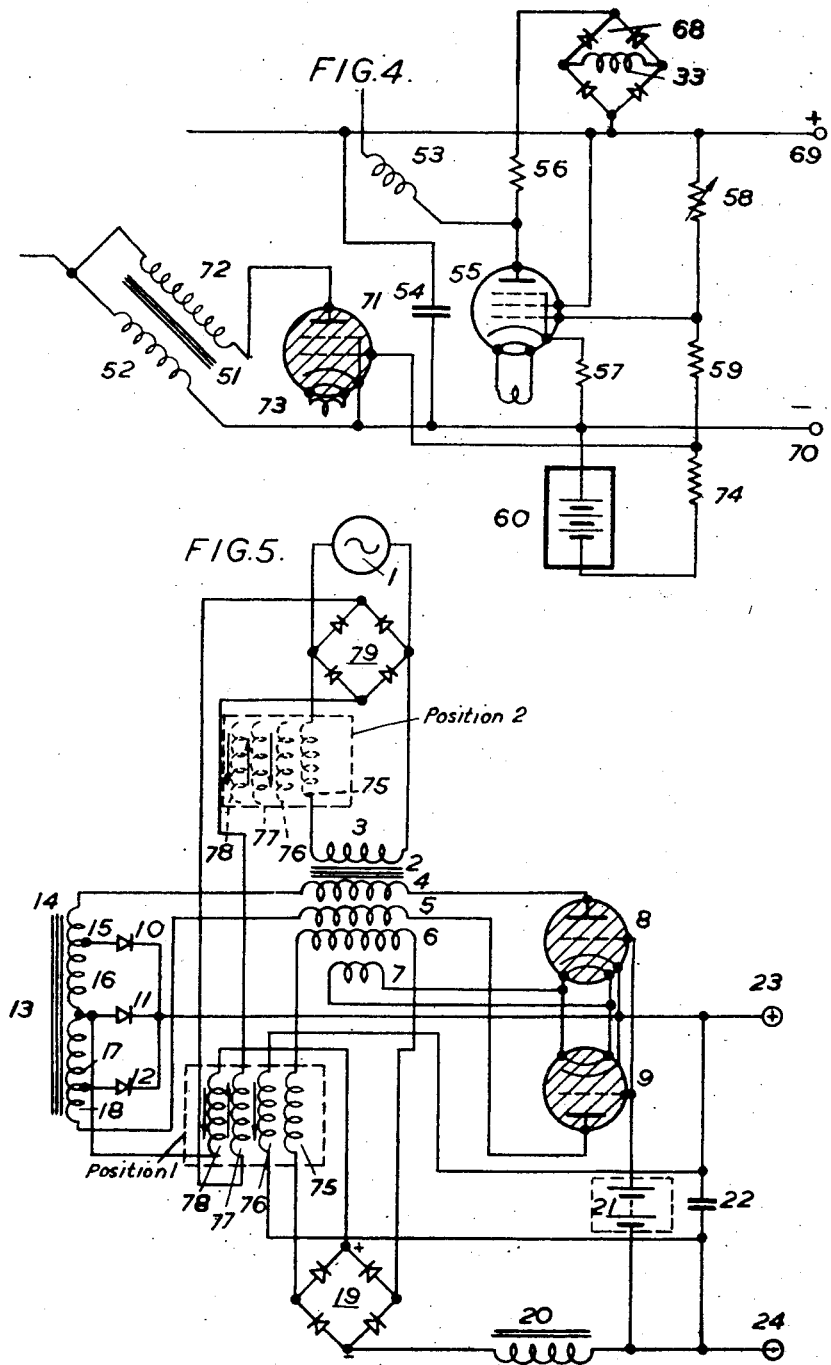

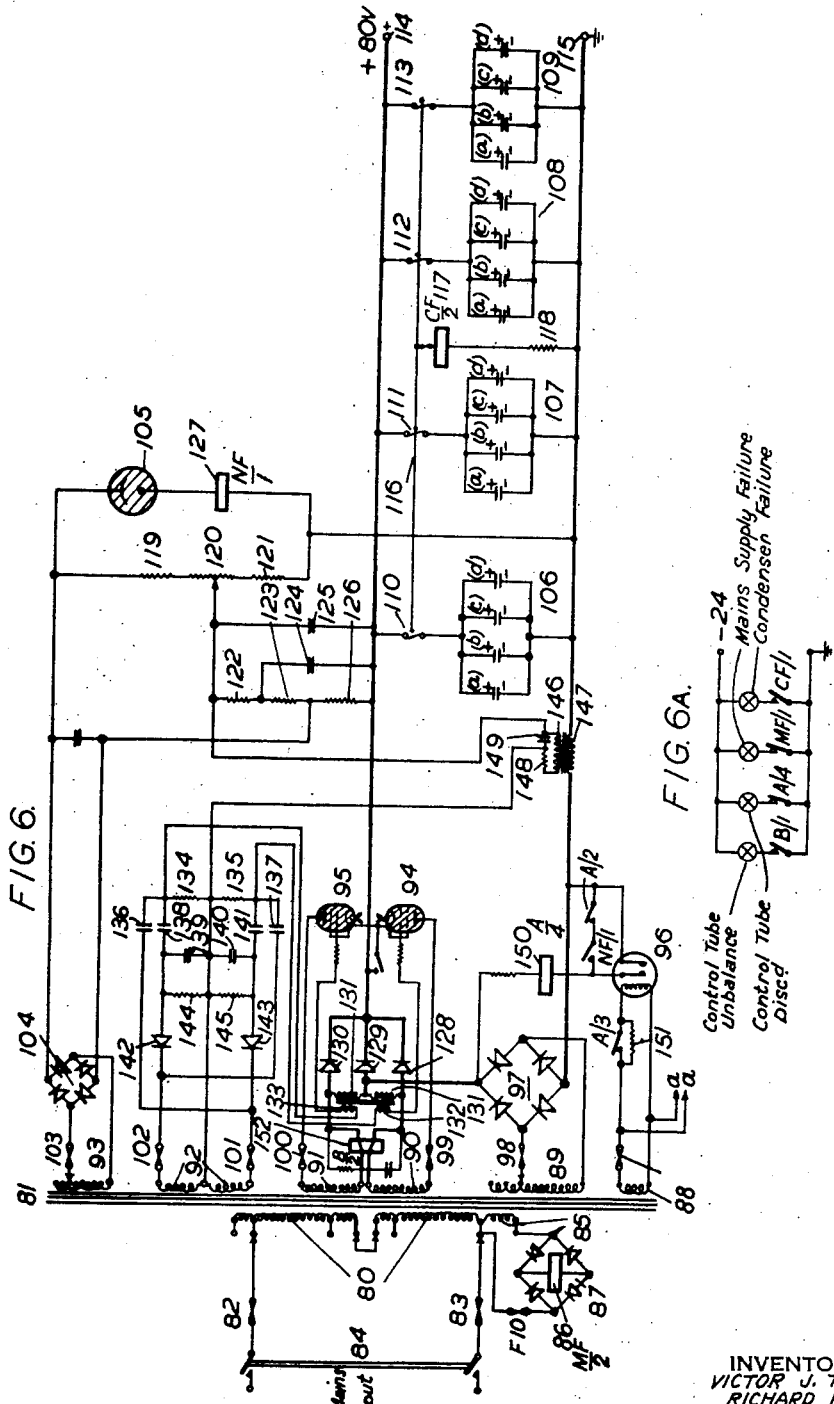

UNITED STATES PATENT OFFICE 2,642,558

ELECTRIC POWER SUPPLY EQUIPMENT

Victor John Terry and Richard Kelly, London, England, assignors to International Standard Electric Corporation, New York, N. Y., a corporation of Delaware Application May 26, 1949, Serial No. 95,418
In Great Britain May 28, 1948

16 Claims. (Cl. 321—18)

This invention relates to electric power supply equipment designed to deliver an output voltage which is substantially constant, and independent of load current and of alternating supply voltage, frequency and wave form or which varies with these parameters in a predetermined manner, and has for its object to provide as large a proportion as possible of the output current and power by simple uncontrolled equipment which is relatively cheap e. g. dry rectifiers, while the necessary regulation is accomplished as efficiently as possible by relatively expensive equipment which is adapted to carry a minimum of the output current or power, the life of such equipment being thereby prolonged as much as possible. Such equipment might be constituted by grid or trigger controlled mercury vapour rectifiers, or by grid controlled hot or cold cathode discharge tubes or electronic devices.

According to one aspect of the invention, there is provided electrical equipment for supplying, from a source of alternating voltage, a unidirectional current at a regulated voltage characterised in that thermionic or ionic control devices to which alternating voltage is applied are used in conjunction with a rectifier or rectifiers to supply the whole or a part of the required unidirectional output through an inductance to a load and the rectifier or rectifiers are so arranged that when the control devices wholly or in part prohibit the flow of current from the alternating voltage source connected thereto, the rectifiers permit the temporary continuation of the unidirectional output current under the impetus of the said inductance.

According to another aspect of the invention, there is provided electrical equipment for supplying from a source of alternating voltage, a unidirectional current at a regulated voltage characterised in that the equipment comprises a main rectifier supplying from the alternating voltage source, the whole required unidirectional output current at a fraction of the desired output voltage and in series therewith an auxiliary rectifier incorporating thermionic or ionic controlling devices to which alternating voltage is applied and through which rectified alternating current flows, the control potentials applied to the said devices being so regulated that the auxiliary rectifier provides the balance of the required unidirectional output voltage.

According to a further aspect of the invention there is provided electrical equipment for supplying, from a source of alternating voltage a unidirectional current at a regulated voltage characterised in that thermionic or ionic control devices to which sources of an alternating voltage are applied and through which rectified alternating current flows are connected in series with windings inductively coupled to other windings to which rectifiers are connected, the said rectifiers supplying unidirectional current to a load in approximate proportions to the current passing through the control devices.

The invention will now be described with reference to the accompanying drawing which shows in its various figures several embodiments illustrating the various aspects of the invention.

In the drawing,

Fig. 3 shows a modification of Fig. 2 in which the controlling means is isolated from the output circuit, while Fig. 3A, representing one form of "D. C. transformer," is an essential element of Fig. 3;

Fig. 4 shows the essential details of a further modification of Fig. 2 designed to prevent excessive variations in output voltage when the full load is suddenly added or removed;

Fig. 5 shows a modification actually applied to Fig. 1 but of general application, in which advantages are secured by a system of pre-stabilisation of the input alternating voltage; and Fig. 6 shows practical details of a preferred embodiment based on Figs. 1 and 2, Fig. 6A indicating the basis of an alarm circuit.

Figure 1:
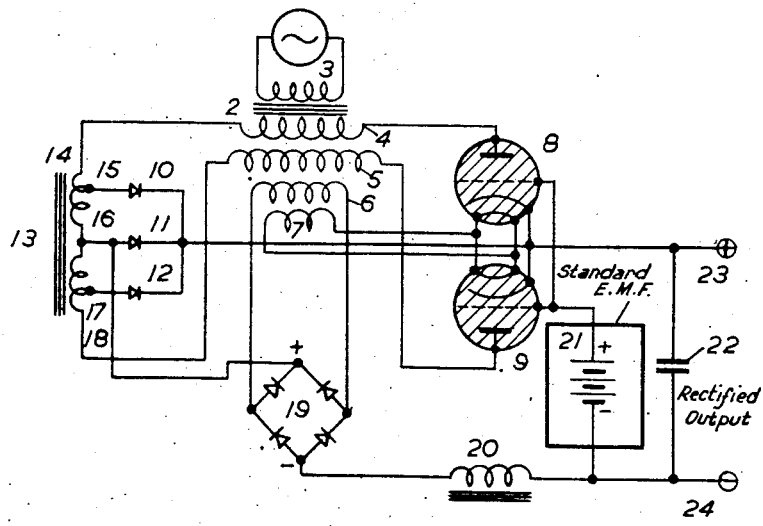
Fig. 1 shows an embodiment designed to supply an output at substantially constant voltage.

Various types of "electronic" regulators associated with rectifier power supply equipment are well known, and one class of such regulators, the "series-regulators" comprise in essence an electronic tube whose anode-cathode impedance is inserted in series with the output from the rectifiers and varied by means of grid control in accordance with the variations of the output voltage or current. In such a case, it is clear, the regulator tube must be able to carry the whole of the output current, and regulation is effected by suitable variation of the dissipation of power in the series tube, which is therefore essentially a source of loss, and the valve is of a type in which the anode-cathode current is at all times under the control of the grid or control electrode. Control is effected from the output with varying degrees of complexity.

In another class of electronic regulator the rectification is accomplished entirely by the application of the alternating supply potential to mercury arc rectifiers or other types of gas discharge tubes in which the commencement of current flow is determined in part by the potential of a control electrode. In this class of rectifier, the control potential is compounded from the output potential and varying A. C. potentials of supply frequency or else is composed of impulses whose repetition rate is determined by the supply and whose phase relation thereto is determined by the output potential.

In these the regulation is determined by timing of the current flow through the tubes and the loss in the tubes, though an unavoidable incidental, may be diminished by improved design of tube.

Equipment according to the present invention is an improvement on the second type retaining its advantages and a conspicuous new advantage of one aspect of the invention so that it confers freedom to make the current handled by the control devices differ from the output current (and in particular to make it much less) and a conspicuous advantage of another aspect of the invention is freedom to make the alternating voltage applied to the control devices differ from that which would be necessary to provide the full rectified voltage if applied to rectifiers or controlled rectifiers in known manner.

These advantages are not mutually exclusive, and the total volt amperes applied to the control devices may be made smaller than the regulated output obtainable from the equipment.

The equipments illustrated in the figures enable a specified output characteristic (including that of constant output voltage) to be maintained at all values of output load, and sudden and extreme variations thereof, and are of particular utility in telegraph systems where the load is continually subject to violent fluctuations by keying.

Other applications of the control equipment may be found in supply equipments with specified output characteristic; e. g. having rising voltage with rising load, or in servo, or follow-up, mechanisms, where a potential generated by one set of equipment is applied remotely to a second set to control its operation in strict dependence thereon.

The supply voltage is assumed to vary by about ±15% from the nominal value, and the output current is assumed to vary from zero to full load.

Referring now to Fig. 1 a source of alternating power 1 is shown connected to the main transformer 2 at its primary winding 3. References 4, 5, 6 and 7 are secondary windings of 2; of which 4 and 5 are connected at one end of each of the anodes of the hot cathode grid controlled gas discharge tubes 8 and 9, while winding 7 supplies power for their heaters, connected in parallel.

References 10, 11 and 12 are metal rectifiers connected to tappings on a centre tapped auto-transformer 13 having tappings 14, 15, 16, 17 and 18, terminals 14 and 18 being connected respectively to the other ends of windings 4 and 5. Reference 19 is a bridge of metal rectifiers supplied from winding 6 of transformer 2 and supplying the load terminals through a smoothing choke 20. Reference 21 represents a source of constant potential, shown as a battery, but is not necessarily such, while reference 22 shows a smoothing condenser connected across output or load terminals 23 and 24.

With normal voltage from source 1 bridge rectifier 19 produces across its positive and negative terminals as shown about half the desired output voltage at full load, and although when the voltage of 1 is high and the load current is zero, the voltage across 19 rises substantially, it does not rise above the desired output voltage. Some additional voltage must therefore at all times be provided by the tubes 8 and 9 and by rectifiers 10, 11 and 12.

The voltage applied to the grids of the tubes 8 and 9 is the difference between the rectified output voltage and the standard voltage supplied by battery 21 (or some equivalent source of constant E. M. F., for example a cold cathode gas discharge diode through which a smoothed rectified current is passed). If the output voltage exceeds the standard voltage by more than three or four volts, the balance of negative voltage applied to the grids of the gas tubes will prevent any discharge through these valves, but if the output voltage is less than the voltage of the standard 21, the grids will be made positive, and the valves will be ready to conduct as soon as the voltage applied between their anodes and their cathodes rises above about 30 to 50 volts in the positive direction. If the output voltage is only slightly above the standard (less than the three or four volts referred to above), a small negative voltage will be applied to the grids and the valves will be ready to fire when their anode cathode voltages reach a high value, say 100 to 200 volts.

In normal operation, one or other of the gas tubes having an (instantaneously) positive potential applied to its anode by winding 4 or 5 of transformer 2 will fire at some part of every half-cycle of the alternating supply. When this happens to valve 8, for example, current flows from the negative output terminal 24 through choke 20, rectifier 19, winding 16 to 14 of autotransformer 13, winding 4 of transformer 2 and the gas tube 8.

The voltage induced by the rising flow of current through windings 16 to 14 of autotransformer 13 renders terminal 17 positive with respect to 16, and causes a current to flow through rectifier 12.

Neglecting the magnetising current of autotransformer 13, the magnitude of the current through rectifier 12 will exceed that in the gas tube 8 in the rato of "n" where $$n = \frac{\text{turns between terminals 14 and 16}}{\text{turns between terminals 16 and 17}}$$

The value of "n" normally lies between one and ten but might have any value between zero and infinity. During one half-cycle, the total rectified current flowing through rectifier 19 is therefore divided between the rectifier 12 and gas tube 8 in the proportion of $$\frac{n}{n+1} \text{ to } \frac{1}{n+1}$$

The auto-transformer 13 is symmetrically wound so that the turns between terminals 14 and 15 equal those between 16 and 18, and the turns between terminals 15 and 16 are equal to those between 16 and 17. Therefore during the part of the next half cycle during which valve 9 is conducting, the rectified current from 19 is similarly divided between rectifier 10 and tube 9.

When the one of the valves (say 8) is conducting, and the voltage applied to its anode is rising, or temporarily constant, the current through the main circuit tends to rise, though restrained by the inductance of choke 20.

Assuming for the sake of simplicity that transformer 13 and the rectifiers 10, 11, 12, and 19, are perfect, and neglecting (for the same reason) the small voltage developed across tube 8 while it conducts (which is in practice about 10 volts), it will be seen that the voltage "$e_4$" instantaneously present in winding 4 is divided so that $$\frac{e_4}{n+1}$$

appears across rectifier 12 and $$\frac{ne_4}{n+1}$$

across winding 16 to 14 transformer 13. The voltage "$e_6$" existing across winding 6, together with $$\frac{e_4}{n+1}$$

is therefore applied to the choke 20 in opposition to the output voltage (to which potential condenser 22 is also charged). So long as the sum of these two alternating potentials exceeds the output voltage, the current in the choke continues to rise, and it will not of course instantly fall to zero when the balance is reversed, and in practice, at moderate or full load will continue to flow throughout the whole cycle. Current will, in these circumstances, continue to flow through half of the rectifiers 19 throughout the alternating current cycle but it will cease in valve 8 when the combined voltage across winding 16 to 17 plus that across 14 to 16 exceeds the voltage in winding 4. Thereafter the current through the choke 20 and rectifier 19 will be divided among rectifiers 10, 11 and 12. Upon the cessation of the current through valve 8, current will cease in rectifier 12 also, and the magnetising current of transformer 13 will commence to flow from rectifier 10. If transformer 13 were truly ideal, the magnetising current would be zero, but in practice this is not so and a progressively diminishing current flows from rectifier 10. If the magnetising current is small compared with the load current, current will also flow through rectifier 11 to make up the balance, and when the magnetising current has fallen sufficiently, current will recommence through rectifier 12.

Before the end of the half cycle, the current may be divided among rectifiers 10, 11 and 12 according to their respective resistances and those of windings 15 to 16 and 16 to 17. Rectifier 11 is not indeed essential, for rectifiers 10 and 12 might carry the whole current, but it adds to efficiency, and, as it never has to sustain much more than half the backward potential applied to rectifiers 10 and 12, it may be made with a lower forward resistance. Its chief purpose resides in the fact that it tends to reduce the unbalance of direct current which, in its absence, would flow through transformer 13 if the rectifiers 10 and 12 were not matched in the forward direction.

After valve 8 has ceased to conduct the current in choke 20 will continue to diminish until valve 9 commences to conduct. In practice, at full load, with $n=1$, and with the alternating supply at its lower limit, valves 8 and 9 each conduct for nearly the whole of every alternate half cycle, and each carries (on the average) one quarter of the load current. Rectifiers 10 and 12 also carry nearly one quarter of the load current and rectifier 11 carries very little.

At full load, and with the supply 1 at its upper limit, the gas tubes 8 and 9 do not as a rule conduct for more than one quarter of a cycle each (usually much less) and each probably carries less than one eighth of the load current.

With normal supply voltage the gas tubes carry something between one eighth and one quarter of the load current, and this fraction is further diminished at smaller loads, so that their life may be greatly protracted for, if certain maxima are not instantaneously exceeded, the life of such valves depends largely on the average current carried.

Between them rectifier 19 carries the full load current at all times and rectifiers 10, 11 and 12 also carry most of the load current at normal times. The life of these elements is however very long even at full load if they are of the selenium or copper oxide type. It is therefore desirable that most of the burden should fall on them rather than on the gas tubes whenever possible.

For smooth regulation it is desirable that the firing instant of the gas tubes should be late or early in the half-cycle according to whether the negative difference between the output voltage and the standard voltage is moderate or small. It will be seen that a very small negative difference permits early firing and that a larger difference may delay firing until the voltage in winding 4 or 5 has risen nearly to its maximum value, but if the gas tubes do not fire before the mid-cycle instant they cannot fire later (unless the output voltage is decaying very rapidly). Therefore there is a minimum voltage pulse or boost that can be delivered from either gas tube and it corresponds approximately to firing at mid-cycle. If that pulse is greater than is needed to supplement rectifier 19 and supply the output current for one half-cycle, the output voltage will rise unduly, and the other gas tube will miss the next half-cycle entirely. Indeed both gas tubes may miss firing for several half-cycles if the load is very small and it is then almost impossible to get a very steady output voltage.

Figure 2:
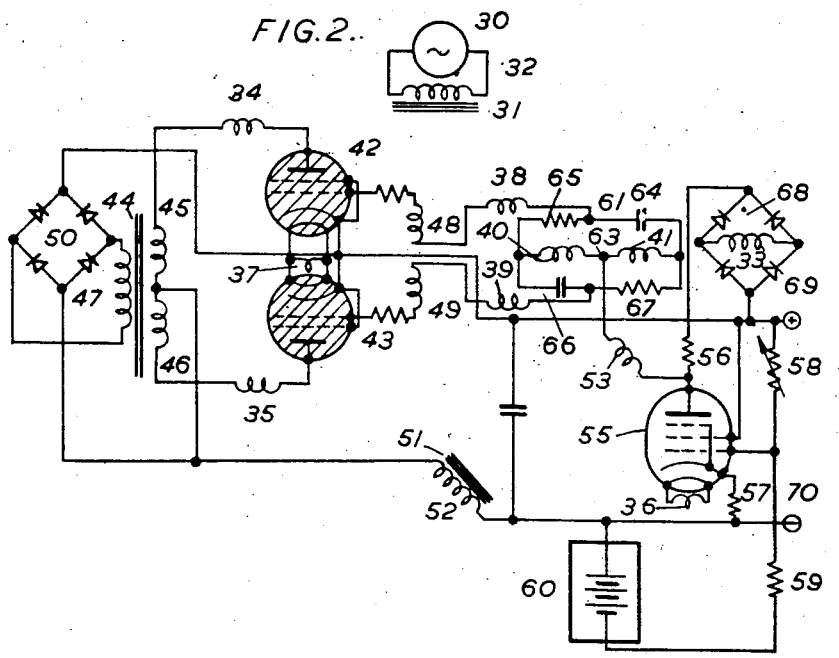
Fig. 2 shows another embodiment, designed to supply an output at a regulatable output voltage.

The embodiment illustrated in Figure 2 includes refinements to overcome these difficulties, these refinements being the more necessary because the circuit of Figure 2 will also permit adjustment of the output voltage from zero to the normal maximum, and the whole of the supply is directly under the control of the gas tubes, although only a proportion of the rectified current passes through them.

Other obvious differences between the circuits of Figures 1 and 2 are the inclusion of a hard valve to amplify the variations of output voltage before applying them to the grids of the gas tubes in order to secure a closer regulation, and correction of the supply of standard voltage which might be the output of another regulated rectifier. (When the output voltages of two regulated supplies are required to vary in unison or in fixed ratio, it is often convenient to use a variable standard to control the second. Such a case would be provided by regulated telegraph batteries of the so-called 80-0-80 volt type).

Referring now to Figure 2, a source of A. C. power is connected to the main input transformer 31 at its primary winding 32, references 33 to 41 indicating further windings on 31. References 42 and 43 indicate grid controlled gas tubes or equivalent devices connected at their anodes over windings 34 and 35 respectively to a transformer 44 having two equal primary windings 45 and 46 to which the anodes are connected. Other windings on this transformer are 47 to 49. Winding 37 of transformer 31 supplies heater power for the tubes 42 and 43.

Winding 47 energises bridge rectifier 50 which is connected at its negative terminal to a smoothing choke, shown at 51, which in this case has additional windings 52 and 53. The associated smoothing condenser is shown at 54, and an amplifying valve 55, which has an anode resistance 56, and a cathode resistance 57, is used to amplify the output voltage variations which will be applied to control the gas tubes 42 and 43. 58 is a variable resistance for the adjustment of output voltage, and 59 is a fixed resistance co-operating with 58 to determine the relation of the output voltage to the standard voltage 60, again represented as a battery. Heater power for valve 55 is supplied by winding 36 of transformer 31.

References 61 to 63 are terminals of a phase determining network, energised by windings 40 and 41 of the main input transformer and having series-connected capacity-resistance arms 64—65, and 66—67 respectively connected at their junction points to the control grids of tubes 42 and 43 via various transformer windings. Reference 68 indicates a bridge rectifier supplying H. T. voltage to valve 55, and energised from winding 33 of the main transformer, and references 69 and 70 are the output terminals of the complete circuit.

In Figure 2 the windings of the transformers and chokes are shown separated, but for ease of reading the core and windings of transformer 31 are shown horizontal, the core and windings of transformer 44 are shown vertical and the core and windings of choke 51 are inclined at 45°.

In Figure 2 no rectifiers corresponding to rectifier 19 of Figure 1 are used, as this would prevent the rectified output voltage from being reduced to zero, when so desired, by control of the gas tubes. Bridge rectifier 50 corresponds to rectifiers 10 and 12 but no rectifier corresponding to 11 is provided. Another rectifier (corresponding to 11 in Fig. 1) across the + and − terminals of rectifiers 50 would indeed add to efficiency but as already explained it is not essential.

The use of separate windings on transformer 44 in conjunction with a bridge of rectifiers is more economical than the arrangement of Figure 1 when the output voltage is low and a high value of "$n$" is chosen, but otherwise the converse may be true.

In Figure 2 the variations of output voltage (or rather variations of a fraction determined by the potentiometer 58—59) amplified by valve 55 are applied to the grids of gas tubes 42 and 43 with the addition of two fixed alternating bias components and two alternating compensating voltages. Windings 48 and 49 of transformer 44 supply the first of the compensating voltages, each amounting to $$\frac{n}{r}$$

of the voltage across winding 47 where $n$ is the ratio $$\frac{\text{turns in windings 45 or 46}}{\text{turns in winding 47}}$$

and $r$ is the control ratio of the gas tubes i. e. the change in anode striking voltage of these valves corresponding to one volt change of grid potential (which is approximately constant over the working range of anode potentials above about 100 volts). Since the anode windings 45 and 46 of transformer 44 are in antiphase, the separate grid windings 48 and 49 are necessary to apply this first compensating potential to the grids. Winding 53, however, applies the second of the compensating potentials in common to both grids. This potential is arranged to be $$\frac{1}{r}$$

of the voltage across the winding 52 of smoothing choke 51.

One of the fixed alternating potentials applied to each grid is also in the nature of a compensating potential, i. e. that which is developed in winding 38 of transformer 31 for valve 42 and that in winding 39 for valve 43. These windings each bear the ratio of $$\frac{1}{r}$$

to one of the anode windings 34 and 35.

It will thus be seen that $$\frac{1}{r}$$

of all of the alternating potentials that affect the anode voltages of the gas tubes are applied to the grids of these tubes, and this is done in such phase that, over the range of anode potentials for which $r$ can be considered approximately constant, the readiness of the valves to fire in response to D. C. voltage derived from valve 55 across anode resistance 56 is unaffected by the anode voltage variations.

The A. C. bias voltages, derived from windings 40 and 41 of transformer 31 through the phase determining network composed of elements 64 to 67, and applied to the grids of 42 and 43, are in quadrature with the main supply from 31 and in such sense that when winding 34 is commencing to drive the anode of 42 positive, terminal 61 is at its maximum negative value with respect to 63 and at the end of the same half-cycle when the voltage across 34 falls towards zero, terminal 61 is at its maximum positive potential with respect to terminal 63. Thus when the anode potential of valve 55 is somewhat negative with respect to terminal 69 it is only towards the end of a half-cycle, when the quadrative potential is driving the grid of 42 positive, that firing can occur to provide rectified voltage for a short period by which to build up current through winding 52. When, however, the anode of 55 is somewhat positive with respect to terminal 69 the quadrative potential (which at the commencement is rendering the grid more negative with respect to its cathode) need not diminish much before the valve is able to fire, and nearly the whole of the half-cycle is available during which current may build up through winding 52.

Thus variation in the anode potential of valve 55 can give a gradual variation in firing instant and in average rectified potential applied to the load through choke 52, whereby the tendency to intermittent operation which is the defect of the simple circuit of Figure 1 is avoided.

In the circuit of Figure 2 the grid potentials of the gas tubes include two components of the supply frequency differing only in phase. These were shown derived from separate windings on transformer 31 for the sake of clarity in the description. By varying the time constants of the resistance capacity combinations 64, 65 and 66, 67, the phase determining network can give any desired phase, and variations of turns in windings 40 and 41 can give any desired magnitude to the potential between terminals 61 and 62. It is therefore quite easy to eliminate windings 38 and 39, and to restore the effect of the grid potentials which they produced by altering the phase determining network and the windings across which it is connected.

In these embodiments a constant rectified output potential is the objective, but variation of the magnitude of this potential in comparison with the standard is easily possible by variations for example of resistance 58 or 59, either manually as by a rheostat, or automatically, e. g. electronically as by constituting one of these resistances a valve impedance. Further the "standard" voltage may itself vary in some predetermined manner, for example, as a voltage to be followed in a follow up or servo mechanism, moreover by applying to the grid of valve 55 only the potential developed across a resistance inserted in the lead between winding 52 and terminal 70, a constant current circuit results. Or alternatively, a summation of grid potentials applied to valve 55, one component of which is obtained indirectly from the standard source, and another component from resistance in the supply lead to terminal 70 (as mentioned above) gives the complete circuit an output characteristic corresponding to a fixed E. M. F. in series with a fixed resistance.

In the embodiments of Figures 1 and 2 the source of standard E. M. F. is connected directly to the negative output terminal and it is convenient that the cathodes of the gas tubes should be connected to the positive output terminal, but if the output is to be regulated only indirectly by the output voltage or current, it may be convenient to have the control potential entirely disconnected from the output circuit.

This means that there must be no direct connection from the grids or the cathodes of the gas tubes to the output circuit.

By a simple modification of the circuit of Figure 2 this is made possible. It will be realised that although different means of supplying the D. C. component of the grid potential will be necessary the main circuit will still operate if the following disconnections and reconnections are made:

I. Disconnect the cathodes of 42 and 43 from the lead connected to terminal 69;

II. Disconnect the junction of windings 45 and 46 from the lead connected to the negative terminal of rectifier 50 and the winding 52 of choke 51;

III. Connect together the cathodes of valves 42 and 43 and the junction of windings 45 and 46.

The arrangement is shown in essence in Fig. 3, and Fig. 3A shows a suitable circuit for supplying the D. C. component of the bias voltage, above referred to. This is one of a number of well-known arrangements for transferring a D. C. potential in circumstances of this kind, and a brief description will be given of its operation.

The potential to be transferred is shown in Fig. 3 at $a$ and $b$, or in amplified form at $c$ and $d$. In Fig. 3A, this potential is assumed to be applied at the input terminals 200, 201, of a ring modulator 202. Carrier for this modulator derived, for example, from 50 C. P. S. mains (although a higher frequency would give greater speed of response) and indicated at 203, is applied through transformer 204 and sideband output from the modulator is taken through transformer 205. Amplification takes place (optionally) in 206 and the sideband is fed to a second ring modulator 207 through transformer 208, supplied with carrier through transformer 209 from the same source 203.

Demodulation takes place in the second modulator and will clearly produce a component at zero frequency equivalent to that fed in at 200—201, and available at 210, 211. Some amount of smoothing should be provided, as at 212, and the D. C. output taken off terminals 213, 214.

The use of the equipment described with the amplifier 206 would render the amplifier 55 and its associated circuits in Fig. 3 redundant, so that terminals 200 and 201 could be connected into terminals $a$ and $b$, and terminals 213 and 214 to terminals $c$ and $e$ the latter being in the cathode circuits of the gas tubes, the equipment between $a$ and $c$ and including 56 and 68 being deleted.

Amplifier 206 is not, however, essential, and in that case, the equipment to the right of the dashed line is eliminated, the primary of 205 and the secondary of 208 becoming one transformer, and the simplified arrangement inserted between $c$ and $d$ (for the input) and between $c$ and $e$ (for the output), terminal $c$ being assumed duplicated with a gap between the two parts.

(In each of these embodiments, transformers 204 and 209 may be combined into a single transformer having one primary, connected to the carrier source, 203, and two secondaries, one in each modulator.)

With the modification described above the rectified currents from the gas tubes no longer contribute directly to the main output of rectified current and if the output is not to suffer, the winding ratios of transformer 44 must be changed also.

One of the purposes of the equipments being described is the provision of a power supply which is immediately responsive to sudden changes in the output demanded. The rate at which the output of a circuit such as that of Figure 2 can be increased is determined by the winding ratios of transformers 31 and 44 in relation to the supply voltage, and the inductance of winding 52 on choke 51, and it can readily be made sufficiently rapid to rise from zero to full load in one or two cycles of the supply. Any more rapid change of load on the circuit must be met by partial discharge of condenser 54, whose total capacity may be such that the charge upon it is equal to the average maximum (full load) output of electricity during about 10 cycles of the supply. It is more difficult to prevent excessive rises of output potential when the load is suddenly switched off unless the condenser 54 is very large and the inductance of winding 52 is kept as small as possible.

The modification of the circuit of Figure 2 shown in Figure 4 illustrates how, without the use of an abnormally large smoothing condenser, excessive increases of potentials may be avoided when the load is suddenly reduced or switched off.

In Figure 4 the additional components comprise a hot cathode gas discharge tetrode 71, an extra winding 72 upon choke 52, an extra winding 73 upon transformer 31, and a resistance 74 in series with the standard source 60. The reference numbers attached to the other items are as listed previously in reference to Figure 2.

The operation of the modification is as follows. Normally the grid of valve 71 is sufficiently negative to prevent the anode from striking with the voltage applied to its anode by windings 52 and 72 of choke 51, (which are in "series aiding" connection). When, however, the potential of terminal 69 rises abnormally upon sudden removal or reduction of the load, the grids of both 55 and 71 are instantaneously rendered positive.

Valve 55 thereupon cuts off valves 42 and 43 by the negative impulse generated at its anode so that no further rectified current is derived from these valves, and the rise in potential across the windings of 51 resultant upon the reduction of current therein (which would otherwise drive current through rectifier 50 and further charge condenser 54), now causes valve 71 to fire limiting the potential rise across these windings (72 and 52) to about 12 volts. The condenser 54 is however prevented from discharging back through valve 61 by the presence of rectifier 50.

It will be realised from the foregoing that, using the embodiment shown in Figure 1 (with or without some of the refinements shown in Figure 2), the total output that can be regulated by a given set of trigger controlled gas discharge valves depends on closeness of the regulation of the A. C. supply and the excellence of the regulation of rectifier 19.

When the supply is subject to variation both in voltage and frequency, and when (as is usual) the percentage variation of the former is greater than that of the latter, it is advantageous to use a saturating iron type of regulator between the source and the rectifier circuit, whereby supply voltage variations are reduced approximately to the magnitude of the frequency variations. Moreover it is advantageous to use instead of the simple rectifier 19 shown in Figure 1 a rectifier regulated, for example, by a saturating choke arrangement, the preferred arrangement of this type being shown in Fig. 5.

This figure shows the circuit of Fig. 1, modified by the inclusion of a multi-winding saturable reactor, alternative positions ("1" and "2") being shown for its inclusion. The reactor is shown within a dashed outline and includes an A. C. winding 75 with auxiliary direct current windings 76, 77, 78; these are given identical numbers in the two positions and will be identified as required by a bracketed reference, thus (1) or (2). In practice, each rector would be duplicated or be of suitable construction to prevent induction into the D. C. paths from the A. C. windings.

Considering first position 1, winding 75 is shown connected in the A. C. path from the winding 6 to the rectifier 19 for the purpose of controlling the flow of energy thereto. Winding 76 carries a steady direct current derived from the load terminals 23, 24. Winding 77 carries a direct current derived by rectification in bridge rectifier 79 from the input alternating current, and this current is arranged to be in opposition to that in winding 77. Winding 78 carries the whole of the direct load current from rectifier 19 in the same direction as the current in winding 76; this winding could of course, be in the lead between rectifier 11 and terminal 23.

Windings 76 and 77 may be considered as acting together, 76 providing a degree of premagnetisation which is neutralised to a greater or lesser extent by winding 77, thereby increasing or decreasing (respectively) the reactance of winding 75 in accordance with increases or decreases (respectively) in the supply voltage.

Winding 78 aids winding 76 in increasing saturation of the core as the load current rises, thereby decreasing the rectance of the winding 75 with increases in load current.

It will thus be appreciated that, by the variations of reactance of the main reactor winding 75, brought about as described by the variations in supply voltage and load current requirements, some degree of compensation of the voltage actually supplied to rectifier 19 is achieved.

In position 2, the several windings perform the same function as described above, but the effect, of course, is to stabilise the supply of A. C. to the A. C. load as a whole, instead of only to the rectifier.

Various permutations within these two positions are permissible. For example, both positions (1) and (2) may be fully equipped as regards their individual windings, but this is a degree of elaboration not, in general, necessary.

Further, source variation only may be provided for by omitting winding 78 and equipping either of the two positions shown.

As a further, and preferred, alternative, source variation may be provided for in position (2), as just described, and load variation simultaneously in position (1) by providing windings 75, and 78 in that position.

In known systems of this kind it is customary to provide a constant potential reference voltage with the aid of a carbon pile regulator or some similar equipment; in this instance, the necessary potential may be provided by the constant voltage source used in connection with the gas tubes, or from the regulated output supply.

Another advantageous combination of the invention with known regulating means is obtained by the use of a tap-changing on-load type regulator, or a motor-controlled dynamic regulating transformer inserted between the A. C. supply and the gas controlled rectifier. With this arrangement large variations of supply voltage occurring slowly are adjusted by the A. C. regulator while the effect of smaller but more rapid changes of supply voltage and load are corrected by the operation of the gas discharge tubes.

The use of this system of pre-regulation by which the equipment of the present invention is supplied from the regulated source, means that the gas tubes have less regulating work to do, being concerned principally with load fluctuations or instantaneous mains fluctuations. Either therefore, smaller tubes may be used, or with the same tubes, more output can be safely controlled.

A preferred embodiment in practical form of the circuits described previously is shown in Fig. 6, which incorporates features from Figs. 1 and 2 with some variations.

The tapped primary winding 80 of the main input transformer 81 is connected to the A. C. supply via fuses 82 and 83 and double pole switch 84. Winding 85 is a small additional winding connected auto-transformer fashion to winding 86 to provide current for a mains failure relay MF (86) connected in a rectifier network 87.

The various independent secondary windings 88—93 on transformer 81 provide the various services previously described, and comprise:

Winding 88 providing heater power for the two gas tubes 94 and 95, and the thermal delay relay 96 (provided to ensure adequate heating of the control tube cathodes before anode-cathode voltage is applied);

Winding 89 providing power for a main metal rectifier 97 via a fuse 98; this winding is tapped to allow of slight adjustments in setting up;

Windings 90 and 91 providing anode power for the two gas tubes 94, 95 respectively via fuses 99, 100;

Winding 92, centre-tapped, feeding via fuses 101, 102 a rectifier-resistance-capacity network to provide the necessary bias and compensating voltages for the gas tubes; and Winding 93, supplying via a fuse 103 and a rectifier bridge network 104 a two-electrode cold-cathode gas discharge tube 105 which provides the standard reference voltage (shown as battery 21 in Fig. 1).

In this embodiment, a hard valve equivalent to 55 of Fig. 2 is not provided for the purpose of amplifying the control potential, nor is there provided the gas filled valve 71 of Fig. 4 for suppressing voltage rise when the load is thrown off, since the reservoir capacity provided is sufficient to absorb excessive surges. This capacity is provided by the blocks of condensers 106—109 each consisting of its elements $a$, $b$, $c$ and $d$, and shown connected, each block by a separate alarm type of fuse 110—113, to the output terminals 114, 115. In the event of an individual condenser failing by short-circuit, the corresponding fuse blows and connects the 80 volt + terminal (114) to the common alarm bus-bar 116 and so operates the common condenser-fail relay 117 over resistor 118.

The standard voltage controlled by tube 105 is developed across potentiometer 119—121 and applied via the variable portion 120 to the controlling circuit, the resistance-capacity network 122—125 providing smoothing. The standard bias so developed is supplemented by a mains voltage-sensitive portion contributed by resistor 126, to provide regulated compensation for mains voltage fluctuations.

The relay NF (127) shown in the gas-tube circuit is a failure relay, adapted to control switch-off of the supply in the event of a failure of this part of the circuit.

The controlling circuit now consists of elements from both Fig. 1 and Fig. 2, with some additional features. The gas tubes, for example, are tetrodes as in Fig. 2, but the associated rectifier arrangement is similar to that of Fig. 1, comprising rectifiers 128—130 (equivalent to 10, 11, 12 of Fig. 1). The transformer 31 has in this case the two secondaries 132, 133 equivalent to 48 and 49 of Fig. 2, connected into the phase determining network associated with winding 92.

The A. C. bias applied to the grids of the gas tubes now comprises:

(I) An approximately reverse phase component obtained across resistors 134, 135 by the E. M. F. applied in reverse through capacitors 136, 137 respectively. The time constant of 134 in combination with capacitors 138, 139 and the corresponding time constant of 135 in combination with capacitors 140, 141 are so long that the string of capacitors 136—141 (including 137) constitutes a condenser potentiometer whose various output voltages are little influenced by resistors 134 and 135.

(II) An approximately saw tooth 50 C. P. S. wave obtained from the half-wave rectifiers 142, 143 and applied to resistors 134, 135 through capacitors 138, 141 respectively. This arrangement is preferable to the use of a 50 C. P. S. quadrature voltage, as previously described, which is the more usual arrangement, as it gives a more uniform variation of the firing of the controlling gas tubes with variation of the applied D. C. voltages on the grids.

Resistors 144, 145 provide D. C. loads for the rectifiers.

(III) The compensating voltages derived in windings 132, 133, previously referred to.

(IV) A pulse generated in the secondary winding 146 of the smoothing choke 147 connected in the negative lead to terminal 115, and applied, after subjection to a phase shift in the resistance-capacity network 148—149, in common to the general phase-shift network 134—145. This bias is equivalent to that produced by winding 53 of Fig. 2.

The remainder of the equipment comprises a certain amount of starting up and alarm circuitry some of which has been already referred to.

On switching on the mains supply via switch 84, relays MF and NF operate, MF disabling the mains failure circuit (not shown in detail, but indicated by an alarm lamp and relay contact MF/1 in Fig. 6A), and NF preparing a holding circuit (at NF1) for relay A (152) when it is operated in due course.

The thermal delay relay 96 eventually operates and closes an operating circuit for relay A over rectifier 97. Relay A locks over NF1 and A2 and substantially de-energises 96 at A3, resistance 151 being a high resistance. Other contacts of A connect the gas tube cathodes to the positive bus-bar (at A1), and provide (at A/4) a "Control Tube Disconnected" alarm, indicated as a lamp in Fig. 6A.

The phase-unbalance relay B (152) having a winding in each of the supplies from windings 90 and 91 is normally held unoperated. Substantial unbalance of the supply through either of its windings will cause the relay to operate and give a suitable alarm, indicated as a lamp (with contact B/1) in Fig. 6A.

The condenser failure relay CF (117) also lights a lamp (at CF/1) in Fig. 6A.

The alarm arrangements have been shown very symbolically, but form part of the standard equipment in installations of this kind.

The equipment described is very suitable for use in providing each half of the 80–0–80 volt power supplies required for the operation of present day telegraph equipment, where the load is liable to fluctuate violently but the battery voltages are required to keep closely alike.

While the principles of the invention have been described above in connection with specific embodiments and particular modifications thereof, it is to be clearly understood that this description is made only by way of example and not as a limitation on the scope of the invention.

What is claimed is:

1. Electrical supply equipment for supplying, from a source of alternating voltage, a unidirectional current at a regulated output voltage, which equipment comprises a main transformer having a primary winding for connection to a source of alternating voltage and a plurality of secondary windings, a main rectifier of the bridge type connected at its A. C. input terminals to one of the said secondary windings and adapted to supply without regulation a substantial portion of the output voltage at the full load current, a pair of grid-controlled gas discharge devices separately coupled at their anodes to separate windings of the said plurality of windings, an auto-transformer connected at its two ends to the free ends, respectively, of the two separate windings supplying the anodes, separate rectifier elements facing in the same electrical direction and connected together on one side of each, the same side for all, and on the other to tappings on the said auto-transformer, one to the electrical centre thereof, and the other two to tappings equally spaced from the centre, the direction of the rectifiers being such as to assist the flow of current from the said main rectifier when connected at one of its output D. C. terminals to the centre of the said auto-transformer, a connection from the other of its output terminals via a smoothing choke to an output terminal of the supply equipment, a connection from the common connection of the said three rectifiers to the other output terminal of the supply equipment, a connection thereto from the cathodes in common of the said gas tubes, a smoothing condenser across the said output terminals, and a source of reference potential so connected as to apply to the control electrodes in common of the said two gas tubes, a controlling potential equal in value to the instantaneous difference between the output terminal voltage and the reference potentials, whereby the said gas tubes may control the supply of a supplementary output voltage to that of the said main rectifier, in accordance with the said reference voltage without themselves carrying the whole of the output current.

2. Electrical supply equipment as claimed in claim 1 and which further comprises a saturable reactor having a main A. C. winding and a plurality of auxiliary D. C. windings, the main winding being included in the supply circuit to the said main rectifier, and the auxiliary windings carrying respectively and separately the main output load current from the said main rectifier, a current proportional to the output supply terminal voltage and assisting the current in the first-described auxiliary windings, and a current proportional to the alternating supply voltage and in opposition to the currents in the first auxiliary windings.

3. Electrical supply equipment as claimed in claim 1 and which further comprises a pair of saturable reactors each having a main A. C. winding and a plurality of auxiliary D. C. windings, the main winding of the first of these reactors being included in the main A. C. supply lead to the main transformer and the main winding of the second reactor being included in the supply lead to the main rectifier, auxiliary windings on the said first reactor carrying respectively and separately and in mutual opposition currents proportional to the main A. C. supply voltage and to the output D. C. supply voltage, and an auxiliary winding on the said second reactor carrying the whole D. C. output load current.

4. Electrical supply equipment as claimed in claim 1 and which further comprises an additional secondary winding on the said main transformer to provide biases for the controlling electrodes separately of the said gas tubes, the said biases being generated in a resistance-capacity-rectifier network adapted to generate (a) an alternating bias for each tube approximately in reverse phase to the alternating voltage applied to the anode of each tube; and (b) an approximately saw-tooth wave for each tube at mains frequency by means of the rectifiers in the said network; together with separate biases developed in separate secondary windings inductively but not metallically coupled to the said auto-transformer; together with an alternating bias derived in a winding inductively coupled to the said choke and applied in common through the said network to the said gas tubes; and in which the said reference potential comprises a two-electrode cold-cathode gas-discharge device which when fired from a secondary winding on the said main transformer via a rectifier network maintains a substantially constant D. C. potential drop across its terminals, together with a potentiometer device for adjusting the output voltage required from the said two-electrode device, smoothing equipment therefor, and a potential dropping resistor associated therewith and adapted to develop a D. C. bias in direct relation to the alternating current supply voltage for application to the said controlling electrodes in common via the said network thereby to counter the effects of mains fluctuations; and associated alarm devices for supply fail, control tube fail or mutual unbalance, and main smoothing condenser fail conditions, and a thermal delay device to enable adequate heating of the control tube cathodes to be effected before the application thereto of anode-cathode potentials.

5. Electrical equipment for supplying from a source of alternating voltage a unidirectional current at a regulated output voltage comprising a pair of output terminals, a main rectifier connected to said source, an auxiliary rectifier connected to said source and comprising a vacuum tube having a control electrode, a transformer having a primary winding in series with said auxiliary rectifier and a secondary winding connected in series with said main rectifier, a further rectifier connected in series with said secondary winding and to one of said output terminals and means connecting said control electrode to a point in said equipment whose voltage varies in accordance with said output voltage.

6. Electrical equipment for supplying from a source of alternating voltage a unidirectional current at a regulated output voltage comprising a vacuum tube having a control electrode, means for connecting said tube to said source for rectification of current therefrom, a transformer connected in series with said tube, a first rectifier connected to said source, an inductance connected in series with said rectifier, a second rectifier connected in series with at least a portion of said transformer, means connecting said first rectifier and said inductance in series with said second rectifier and said transformer and means connecting said control electrode to a point in said equipment whose voltage varies with said output voltage.

7. Electrical equipment for supplying from a source of alternating voltage a unidirectional current at a regulated output voltage comprising a pair of output terminals, a vacuum tube having a control electrode, means for cooperatively associating said tube with said source for rectification of current therefrom, a transformer connected in series with said tube, a first rectifier connected to said source, an inductance connected in series with said rectifier, a second rectifier connected in series with at least a portion of said transformer, means connecting said first rectifier and said inductance in series with said second rectifier, said transformer and said output terminals and means connecting said control electrode to one of said output terminals.

8. Electrical equipment for supplying from a source of alternating voltage a unidirectional current at a regulated output voltage, comprising a pair of output terminals, a first rectifier connected to said source and comprising a vacuum tube having a control electrode, a transformer having a primary winding connected in series with said tube and to one of said terminals and having a secondary winding, means connecting said tube to the other of said terminals, a second rectifier connected between said secondary winding and one of said pair of output terminals and means connecting said control electrode to a point in said equipment whose voltage varies with said output voltage.

9. Electrical equipment for supplying from a source of alternating voltage a unidirectional current at a regulated output voltage comprising a pair of output terminals, a first rectifier connected to said source and comprising a vacuum tube having a control electrode, a transformer having a primary winding and a secondary winding, means connecting said tube and said primary winding in series to said output terminals, a second rectifier connected in series between said secondary winding and said output terminals and means connecting said control electrode to one of said output terminals.

10. Electrical equipment for supplying from a source of alternating voltage a unidirectional current at a regulated output voltage comprising a pair of output terminals, a first rectifier connected to said source and comprising a vacuum tube having a control electrode, a transformer having a primary winding and a secondary winding, means connecting said primary winding and said tube in series to said terminals, a choke, a second rectifier, means connecting said choke, said second rectifier and said secondary winding in series to said output terminals, a phasing network connected to said source, a source of reference potential and means connecting said phasing network and said source of reference potential in series between one of said terminals and said control electrode.

11. Electrical supply equipment for supplying from a source of alternating voltage a unidirectional current at a regulated output voltage, which equipment comprises D. C. supply output terminals, a main transformer having a primary winding for connection to said source of alternating voltage and a plurality of secondary windings, a subsidiary transformer having a center-tapped primary winding and a plurality of secondary windings, a pair of grid-controlled gas discharge devices separately coupled at their anodes to separate windings of said plurality of windings of said main transformer, the other ends of the said separate windings being connected to the ends of the center-tapped primary winding of said subsidiary transformer, a rectifier bridge network connected at its A. C. input terminals to one of the said plurality of windings of said subsidiary transformer and at its D. C. output terminals to said supply output terminals, a smoothing choke connected in series with one of the said supply output terminals and the said bridge, a smoothing condenser connected across said supply output terminals, a source of reference potential, a D. C. amplifier adapted to amplify a D. C. potential and connected, at its input, to said source of reference potential and to a supply output terminal and at its output, to the grids of said discharge devices, a phasing and biasing network connected to said main transformer and adapted to supply to the said grids separately components of an alternating voltage having respectively quadrature relationship and in-phase relationship with the main input alternating voltage, and means connecting said network, windings of said subsidiary transformer and said choke to said grids.

12. Electrical supply equipment for supplying from a source of alternating voltage a unidirectional current at a regulated output voltage, which equipment comprises D. C. supply output terminals, a main transformer having a primary winding for connection to said source of alternating voltage and a plurality of secondary windings, a subsidiary transformer having a center-tapped primary winding and a plurality of secondary windings, a pair of grid-controlled gas discharge devices separately coupled at their anodes to separate windings of said plurality of windings of said main transformer, the other ends of the said separate windings being connected to the ends of the center-tapped primary winding of said subsidiary transformer, a rectifier bridge network connected at its A. C. input terminals to one of the said plurality of windings of said subsidiary transformer and at its D. C. output terminals to said supply output terminals, a smoothing choke connected in series with one of the said supply output terminals and the said bridge, a smoothing condenser connected across said supply output terminals, a source of reference potential, a modulator having input terminals connected to said source of alternating voltage and to said output terminals and having output terminals, a demodulator having input terminals connected to the output terminals of said modulator and to said source of alternating voltage and having output terminals, a phasing and biasing network connected to said main transformer and adapted to supply to the said grids separately components of an alternating voltage having respectively quadrature and in-phase relationship with the main input alternating voltage and means connecting said network, windings of said subsidiary transformer, said choke and the output terminals of said demodulator in series and to the grids of said discharge devices.

13. Electrical equipment for supplying from a source of alternating voltage, a unidirectional current at a regulated output voltage, comprising a pair of main output terminals, a main rectifier connected to said source and comprising a pair of output terminals, an auxiliary rectifier connected to said source and comprising a vacuum tube having a control electrode, an impedance series connected between said auxiliary rectifier and an output terminal of said main rectifier, means connecting the other output terminal of said main rectifier to the other of said main output terminals, means connecting said auxiliary rectifier to the other main output terminal, a third rectifier connected between said impedance and said last mentioned main output terminal, and means connecting said control electrode to the said first mentioned main output terminal whereby the voltage of said control electrode varies in accordance with the output voltage.

14. Electrical equipment for supplying from a source of alternating voltage a unidirectional current at a regulated output voltage comprising a pair of output terminals, a main rectifier cooperatively connected to said source in a manner to derive a direct current output therefrom, an auxiliary rectifier connected to said source and to said main rectifier and comprising a pair of electron discharge devices each having a control electrode, a transformer having a primary winding for connection to said source and a plurality of secondary windings, an auto transformer provided with a center tap, output leads and a tap each side of center, tertiary rectifiers comprising a pair of rectifying elements series connected respectively in like phase between a tap each side of center and one of said output terminals, means connecting said auxiliary rectifiers between said one output terminal and one each of said secondary windings, means connecting the opposite ends of said secondary windings to the output terminals of said auto transformer, means connecting the output of said main rectifier between the center tap of said auto transformer and the opposite main output terminal, a source of biasing voltage, and means series connecting said biasing source between said control electrodes and said last mentioned main output terminal.

15. In a device of the character described, the combination with a power transformer including primary winding, a first center tapped secondary winding and second, third and fourth secondary windings, a main rectifier including a pair of output terminals, means connecting said rectifier to said second winding, a pair of power output terminals, means connecting said rectifier output terminals to said power terminals, means connecting ends of said third and fourth secondary windings in polarity opposition to the ends of said center tap winding, a pair of rectifier elements including control elements, means series connecting said rectifier elements between opposite ends of said third and fourth windings and one of said power output terminals, and means operatively associating the control elements of said auxiliary rectifier with the other said power output terminals for regulation of conductance through said rectifiers in response to potential variations across said power output terminals.

16. Electrical equipment for supplying from a source of alternating current, a regulated output voltage, comprising an electrical network including a power transformer provided with primary winding, a center tapped secondary winding, and three additional secondary windings, a pair of power output terminals, a main rectifier, and two electron discharge devices including control elements, means connecting one of said power terminals to the center tap of said first mentioned winding, means connecting the opposite ends of said center tap winding to opposite ends of two additional windings, means series connecting said electron discharge device between the opposite ends of said two additional windings and the other power terminal, means connecting the other of said additional windings to the input of said main rectifier, means connecting the output of said rectifier to said power terminals, means connecting said control elements to a source of biasing potential, means cooperatively associating said source of biasing potential with the power output terminal leading to said center tap to provide a control bias responsive to potential variations across said output terminals.

VICTOR JOHN TERRY.
RICHARD KELLY.

References Cited in the file of this patent
UNITED STATES PATENTS

| Number | Name | Date |
|---|---|---|
| 1,654,937 | Knight | Jan. 3, 1928 |
| 1,654,979 | Knight | Jan. 3, 1928 |
| 1,915,074 | Stone | June 20, 1933 |
| 2,299,942 | Trevor | Oct. 27, 1942 |
| 2,334,528 | Amsden | Nov. 16, 1943 |
| 2,547,162 | Kidd | Apr. 3, 1951 |